_United States Patent Office_ 2,704,413
Patented Mar. 22, 1955

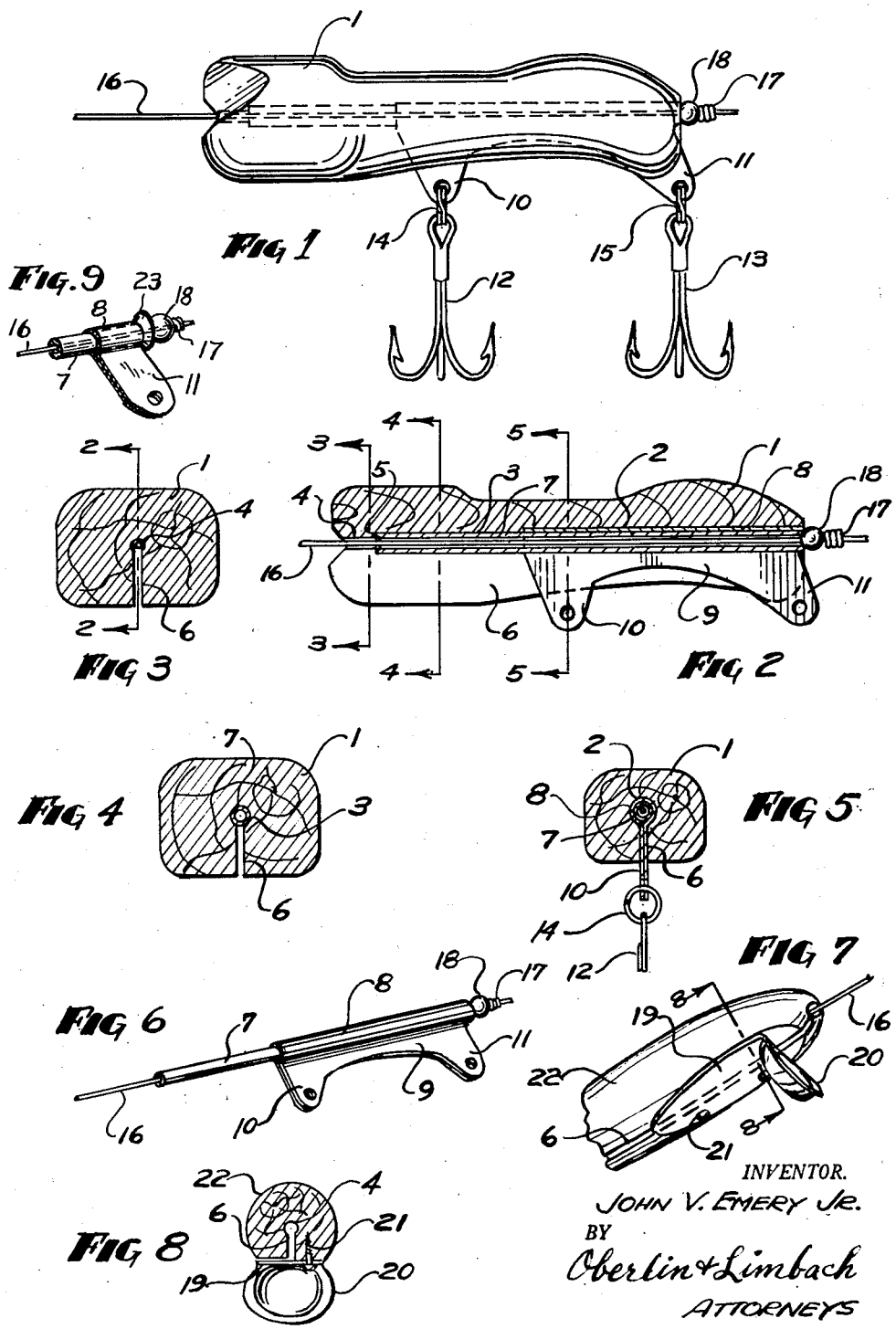

2,704,413
FISHING LURE
John V. Emery, Jr., Lakewood, Ohio

Application January 21, 1952, Serial No. 267,393

15 Claims. (Cl. 43—42.09)

This invention relates as indicated to a fishing lure, and more particularly to a fishing lure having a separable body and hook-carrying member.

A wide variety of lures commonly referred to as "plugs" are currently manufactured and employed by fishermen having a body portion shaped and colored to simulate minnows, frogs, mice, squid, etc., and the fisherman will frequently carry a rather large assortment of such lures with him in his tackle box or pockets so that if the fish fail to find one model sufficiently enticing, another form may be substituted therefor. Triple hook assemblies are most commonly attached to such lures with as many as three sets of such triple hook assemblies being thus attached to a single lure at spaced intervals therealong. In consequence, such lures take up a great deal of room in the tackle box and tend to become more or less inextricably entangled with one another. When the fisherman does not wish to carry a tackle box with him on an excursion along a stream or shore of a lake, for example, it is quite impractical for him to take along extra lures of this type since the hooks will, of course, become caught in any coat pocket and in any case make such lures dangerous to handle without special precaution.

It is accordingly a principal object of my invention to provide a novel fishing lure, and particularly a lure having a sizable body member such as the usual "plug" having a demountable hook carriage assembly so that a number of different lure bodies may be carried by the user who need, however, have but a single hook carriage with him.

Another object is to provide such novel lure in which such hook carriage is adapted to be inserted and secured without the employment of special latches and the like and with a minimum of fuss and bother.

A further object is to provide attaching means for such lure adapted to be secured to such hook carriage and the fishing line whereby the lure bodies may be readily mounted on such carriage without the necessity of detaching the latter from the line.

Still another object is to provide mounting means for the lure of this invention which will eliminate the necessity for the usual snap and swivel in advance of such lure.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is a side elevational view of a typical fishing lure or plug embodying my invention;

Fig. 2 is a vertical longitudinal sectional view through the body of such lure;

Fig. 3 is a vertical transverse section taken on the line 3—3 on Fig. 2;

Fig. 4 is a vertical transverse section taken on the line 4—4 on Fig. 2;

Fig. 5 is a vertical transverse section taken on the line 5—5 on Fig. 2;

Fig. 6 is a perspective view of one form of my hook carriage adapted to be inserted in the body of the lure;

Fig. 7 is a perspective view of the front portion of another well-known type of lure modified for insertion of a hook carriage in accordance with my invention;

Fig. 8 is a transverse section taken along the line 8—8 on Fig. 7; and

Fig. 9 is a fragmentary view of a modified form of the trailing end portion of the hook carriage assembly.

Now referring more particularly to such drawing and especially Figs. 1–6 thereof, the particular embodiment of my invention there illustrated comprises a body portion 1 which may be of wood, for example, shaped as desired to resemble a minnow, swimming mouse or the like. A hole 2 is drilled axially of such body portion from the rear or trailing end thereof and is provided with a continuation 3 extending toward the front or leading end of the body. A considerably smaller axial hole 4 continues from the end of extension 3 to the leading end of the body, thereby providing a definite shoulder at 5. A narrow longitudinal slot 6 extends from such aligned axial holes 2, 3 and 4 to the underside of body 1, such slot being substantially narrower than the diameters of holes 2 and 3 but of substantially the same width as the diameter of hole 4.

The hook carriage comprises a copper tube 7 about which a thin sheet of copper 8 has been folded and caused to conform thereto with opposed portions of such sheet extending in double thickness in a flat plane 9. Such sheet will be brazed or otherwise secured to tube 7 and the two opposed faces of the sheet likewise desirably brazed together. Such doubled portion 9 may have one, two, or more extensions such as 10 and 11 to which triple hooks 12 and 13 may be secured as by means of split rings 14 and 15. The diameter of portion 8 will preferably be such as to make a press fit in hole 2, and the protruding portion of tube 7 may similarly make a press fit in hole 3. This latter refinement, however, is not essential and hole 2 may, if desired, extend to shoulder 5. The double thickness sheet portion 9 will be dimensioned to fit snugly in slot 6 with only portions 10 and 11 protruding from the latter. Tube 7 will be of a length to extend from shoulder 5 to the rear or trailing end of body portion 1.

A gut or nylon leader 16 may be inserted through tube 7 and knotted at its end 17 with a copper bead 18 threaded thereon between such knot and the rear end of tube 7 to serve as a swivel bearing. The other end of leader 16 may be permanently secured to the end of the fishing line, no snaps or swivels being required in advance of the lure.

From the foregoing, it will readily be seen that when the carriage assembly illustrated in Fig. 6 has been inserted into the body portion 1 until the end of tube 7 abuts against shoulder 5 a unitary lure is thereby provided suitable for casting, trolling, etc., and whenever the user wishes to change the form of lure employed he need merely press against one of the protruding carriage extensions 10 or 11 to slide such carriage out of the body with leader 16 being withdrawn through slot 6 and a new and different body member may then be mounted on the carriage. Consequently, the fisherman may conveniently carry in his pocket a number of different lure bodies without any trouble due to the usual hooks secured thereto, and a much larger number of such bodies may be stored in a given tackle box than has been possible in the past. No special catches or latch mechanisms are required which may become broken or deformed, and the lure is free of any objectionable protuberances or attaching devices. No snap or swivel is required in advance of the lure since bearing 18 is entirely effective to prevent twisting or kinking of the leader. The lure body if made of wood should, of course, be waterproof and the holes and slot therein may be waxed, for example, to this end. Of course, the lure body may also be formed of synthetic plastic in well known manner or any other desired and suitable material.

Many lures now popular with fishermen have a metal plate or action member such as 19 mounted thereon with a protruding portion such as 20 adapted to cause a disturbance in the water and to give the lure a wobble action. By employing attaching means such as screws 21 to one side of slot 6, it is possible to withdraw the leader laterally from slot 6 between plate 19 and body 22. Various other similar modifications of existing lures will be readily apparent.

Sheet portion 9 may fit quite tightly in slot 6, and of course when the lure is in use the pull on leader 16 tends to hold the leading end of tube 7 firmly against shoulder 5. The length of sheet or flange portion 9 may obviously vary as may also the number of protruding hook-carrying portions such as 10 and 11. Whether single, double, or triple hooks are employed is a matter of choice. Broadly speaking, a longitudinally extending key-way is formed in body portion 1 with tube 7 fitting in the laterally enlarged or offset part of such key-way to prevent withdrawal of flange 9 under normal conditions of use. Slot 6 continues for the entire length of body 1 to permit release of leader 16 or other connecting means secured to the hook carriage when the latter is to be detached. The portion of the carriage (tube 7) fitting in the offset part of the keyway abuts a stop (shoulder 5) which causes body 1 to become integral with the hook carriage for all practical purposes in use. The hook carriage may be of other metal than copper, and even of certain synthetic plastics.

Referring now to Fig. 9 of the drawing, the trailing end of tube 7 may be flared to form a collar 23 which will serve as a stop to prevent the tube from entering any further into the axial opening in the body member. This makes it unnecessary to provide a shoulder such as 5, and hole 2 may extend the entire length of the body, if desired. Flared end 23 also serves to seat bearing 18 and assists in holding carriage portion 8 in place. If bearing 18 is of copper, tube 7 may desirably be of a harder material such as stainless steel or brass. Of course, if a hook carriage of the Fig. 6 type is employed, hole 2 may likewise extend the entire length of the lure body relying on a press fit of the carriage within the body. Similarly, bearing 18 may be made too large to enter hole 2, thereby holding the tubular portion and body member together without the necessity of a tight press fit. The number of beads 18 thus employed may, of course, be varied. The term "leader" as used herein is intended broadly to include the usual gut, wire, nylon, fishing line, and the like. A positive stop such as shoulder 5 or flange 23 will however ordinarily be preferred.

Other modes of applying the principle of the invention may be employed, change being made as regards the details described, provided the features stated in any of the following claims or the equivalent of such be employed.

I therefore particularly point out and distinctly claim as my invention:

1. A fishing lure comprising an elongated wooden body portion having a generally axial longitudinally extending round hole therein from the trailing end thereof, a further hole of less diameter continuing therefrom to the leading end of said body portion, and a slot of less width than the diameter of such first hole extending longitudinally of the underside of said body portion and entering such holes for the entire length thereof, a shoulder being formed where such first hole terminates and such second hole of less diameter continues therefrom; a hook carriage comprising a length of metal tube, a thin metal sheet doubled thereabout and bonded thereto with the two closely opposed portions of said sheet extending in a flat plane therefrom, said tube with said enclosing sheet being dimensioned to make a press fit in such first hole and slot when inserted therein with one end of said tube abutting such shoulder and the other end of said tube terminating at the trailing end of said body portion, portions of said sheet protruding from such slot, and fish-hooks attached to said protruding portions; a leader extending through such second hole in the leading end of said body portion and through said tube in such hole of larger diameter, said leader terminating in a knot beyond the trailing end of said tube, and a bead threaded on said leader between said knot and such end of said tube to serve as a swivel bearing, whereby said hook carriage may be axially inserted in and removed from said body portion with said leader passing laterally through such slot during such operations.

2. A fishing lure comprising an elongated body portion having a generally axial longitudinally extending hole therein from the trailing end thereof, a further hole of less diameter continuing therefrom to the leading end of said body portion, and a slot of less width than the diameter of such first hole extending longitudinally of the underside of said body portion and entering such holes for the entire length thereof, a shoulder being formed where such first hole terminates and such second hole of less diameter continues therefrom; a hook carriage comprising a length of metal tube and a flat flange extending laterally therefrom, said tube and flange being dimensioned to make a press fit in such first hole and slot when inserted therein with one end of said tube abutting such shoulder and the other end of said tube terminating at the trailing end of said body portion, a portion of said flange protruding from such slot, and a fish-hook attached to said protruding portion; a leader extending through such second hole in the leading end of said body portion and through said tube in such hole of larger diameter, and a bearing member secured on said leader beyond the trailing end of said tube to engage the latter to serve as a swivel bearing, whereby said hook carriage may be axially inserted in and removed from said body portion with said leader passing laterally through such slot during such operations.

3. A fishing lure comprising an elongated body portion having a generally axial longitudinally extending hole therein from the trailing end thereof but narrowing short of the leading end thereof, and a slot of less width than the diameter of such hole extending longitudinally of the entire length of said body portion and entering such hole for the entire length of the latter, a shoulder being formed where such hole narrows and such slot continues therebeyond; a hook carriage comprising a tube and a flange extending laterally therefrom, said tube being dimensioned to fit snugly in such hole with said flange in such slot and with one end of said tube abutting such shoulder and the other end of said tube terminating adjacent the trailing end of said body portion, a portion of said flange protruding from such slot, and a fish-hook attached to said protruding portion; a leader extending through the hole in the leading end of said body portion and through said tube, and a bearing member secured on said leader beyond the trailing end of said tube to engage the latter to serve as a swivel bearing, whereby said hook carriage may be axially inserted in and removed from said body portion with said leader passing laterally through such slot during such operations.

4. A fishing lure comprising an elongated body portion having a generally axial longitudinally extending hole therein from the trailing end thereof but narrowing short of the leading end thereof, and a slot of less width than the diameter of such hole extending longitudinally of the entire length of said body portion and entering such hole for the entire length of the latter, a shoulder being formed where such hole narrows and such slot continues therebeyond; a hook carriage comprising an elongated member adapted to fit snugly in such hole with one end abutting such shoulder and having a flange extending laterally therefrom adapted to fit in such slot, a fish-hook attached to said flange; and a leader secured to said elongated member extending through the hole in the leading end of said body portion.

5. A fishing lure comprising a body portion having a hole of a certain diameter therein extending longitudinally thereof only partially therethrough and a slot of less width than the diameter of such hole extending longitudinally of the entire length of said body portion and entering such hole for the entire length of the latter, a shoulder being formed where such diameter hole terminates and such slot continues therebeyond; and a hook carriage comprising an elongated member fitting snugly in such hole with one end abutting such shoulder and having a flange extending laterally therefrom fitting in such slot, a fish-hook attached to said flange, and means for connecting a leader to said elongated member to extend through such slot.

6. A fishing lure comprising a body portion having a slot therein extending the length thereof, such slot having a laterally offset portion along its inner edge to form a keyway extending from the trailing end of said body portion part way only toward the leading end thereof; and a hook carriage comprising a thin member fitting in such slot and having a laterally offset portion fitting in such offset portion of such slot, a fish-hook connected to said member, and means for connecting a leader to said member to extend through such slot.

7. A fishing lure comprising a body portion having a slot therein extending the length thereof, such slot having a laterally enlarged portion extending from the trailing end of said body portion part way only toward the leading end of such slot; and a removable hook carriage member having a portion inserted in such enlarged portion from the trailing end thereof and frictionally held therein, a fish-hook connected to said member, and means for connecting a leader to said member to extend through the leading end portion of such slot.

8. A fishing lure comprising a body portion having a slot therein extending the length thereof, such slot having a laterally enlarged portion extending from the trailing end of said body portion part way only toward the leading end of said slot, and a sheet metal action member mounted on the leading end of said body portion and extending across the outer opening of such slot, said action member being secured to said body portion on one side of such slot only; and a removable hook carriage member inserted in such enlarged portion from the trailing end thereof and frictionally held therein, a fish-hook connected to said member, and means for connecting a leader to said member to extend through the leading end portion of such slot.

9. A fishing lure comprising a body portion having an elongated passage extending therethrough from the leading end to the trailing end thereof, such passage being enlarged in such trailing end portion, a hook carriage member adapted to be removably inserted in such enlarged portion and dimensioned to prevent its passage through the leading end portion of such passage, and means for connecting a leader to said member to extend through such leading end portion of such passage.

10. A fishing lure comprising a body portion having a hole extending therethrough from the leading end to the trailing end thereof, and a slot extending longitudinally of the entire length of said body portion and entering such hole for the entire length of the latter, at least a portion of such hole entering from the trailing end thereof being wider than said slot; and a hook carriage removably longitudinally insertable into such hole and slot from the trailing end thereof including a portion adapted to fit in such hole but too wide for passage through said slot, and an abutment adapted to limit forward movement of said carriage within said body but permitting rearward withdrawal thereof, said carriage being adapted to have a leader or the like secured thereto to extend from the leading end thereof and said carriage being transversely dimensioned to fit snugly in said body portion and to be frictionally held therein against rearward withdrawal.

11. A fishing lure comprising a body portion having a hole extending therethrough from the leading end to the trailing end thereof, and a slot extending longitudinally of the entire length of said body portion and entering such hole for the entire length of the latter, at least a portion of such hole entering from the trailing end thereof being wider than said slot; and a hook carriage removably longitudinally insertable into such hole and slot from the trailing end thereof comprising a tubular portion adapted to fit in such hole and having a flaring trailing end adapted to limit forward movement of said carriage within said body portion, said tubular portion being too wide to enter said slot, and means for securing a hook to said carriage.

12. A fishing lure comprising a body portion having a hole extending therethrough from the leading end to the trailing end thereof, and a slot extending longitudinally of the entire length of said body portion and entering such hole for the entire length of the latter, at least a portion of such hole entering from the trailing end thereof being wider than said slot; and a hook carriage removably longitudinally insertable into such hole and slot from the trailing end thereof comprising a tubular portion adapted to fit in such hole and having a flaring trailing end adapted to limit forward movement of said carriage within said body portion, said tubular portion being too wide to enter said slot, a leader extending through said tubular portion, a bearing member secured on said leader in rear of said flared end adapted to engage the latter to serve as a swivel bearing, and means extending into said slot from said tubular portion for securing a fish-hook thereto.

13. A fishing lure comprising a body portion having a hole extending therethrough from the leading end to the trailing end thereof, and a slot extending longitudinally of the entire length of said body portion and entering such hole for the entire length of the latter, at least a portion of such hole entering from the trailing end thereof being wider than said slot; and a hook carriage removably longitudinally insertable into such hole and slot from the trailing end thereof comprising a tubular portion adapted to fit in such hole, said tubular portion having a portion forming a stop and said body portion having a shoulder formed therein engaging said stop to limit forward movement of said tubular portion within said body portion but permitting rearward withdrawal of said tubular portion, said body portion having a shoulder adapted thus to be engaged, said tubular portion being too wide to enter said slot, and means for securing a hook to said carriage.

14. A fishing lure comprising a body portion having a hole extending therethrough from the leading end to the trailing end thereof, and a slot extending longitudinally of the entire length of said body portion and entering such hole for the entire length of the latter, at least a portion of such hole entering from the trailing end thereof being wider than said slot; and a hook carriage removably longitudinally insertable into such hole from the trailing end thereof including a tubular portion adapted to fit in such hole, means for securing a hook to said carriage, a leader extending through said tubular portion, and bearing means on said leader at the trailing end of said body too large to pass through such hole.

15. A fishing lure comprising a body portion having a hole extending therethrough from the trailing end to the leading end of said lure, a hook carriage member inserted in said hole, stop means on said body portion engaging said hook carriage member positively to prevent forward withdrawal only of the same from said body portion, and leader means extending through the leading end of such hole and engaging said hook carriage member, said hook carriage member being transversely dimensioned to fit snugly in such hole whereby rearward withdrawal therefrom is resisted by friction only.

References Cited in the file of this patent

UNITED STATES PATENTS

| Number | Name | Date |
|---|---|---|
| 360,339 | Cooke | Mar. 29, 1887 |
| 1,207,588 | Maus | Dec. 5, 1916 |
| 1,723,557 | Ono | Aug. 6, 1929 |
| 2,204,552 | Singleton | June 18, 1940 |
| 2,587,736 | Kindscher | Mar. 4, 1952 |
| 2,593,220 | Thompson et al. | Apr. 15, 1952 |